R. F. STEWART.
DRIVING MECHANISM FOR AUTOMOBILES.
APPLICATION FILED SEPT. 9, 1905.
905,244.
Patented Dec. 1, 1908.
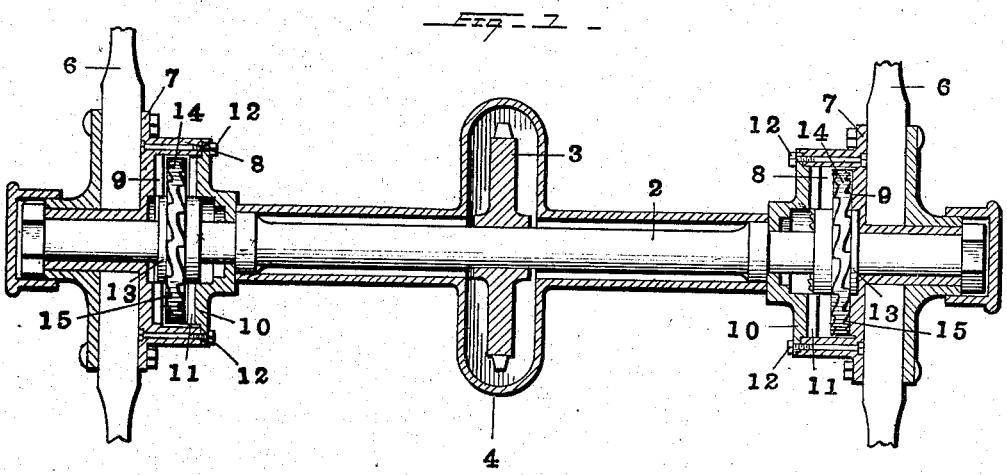
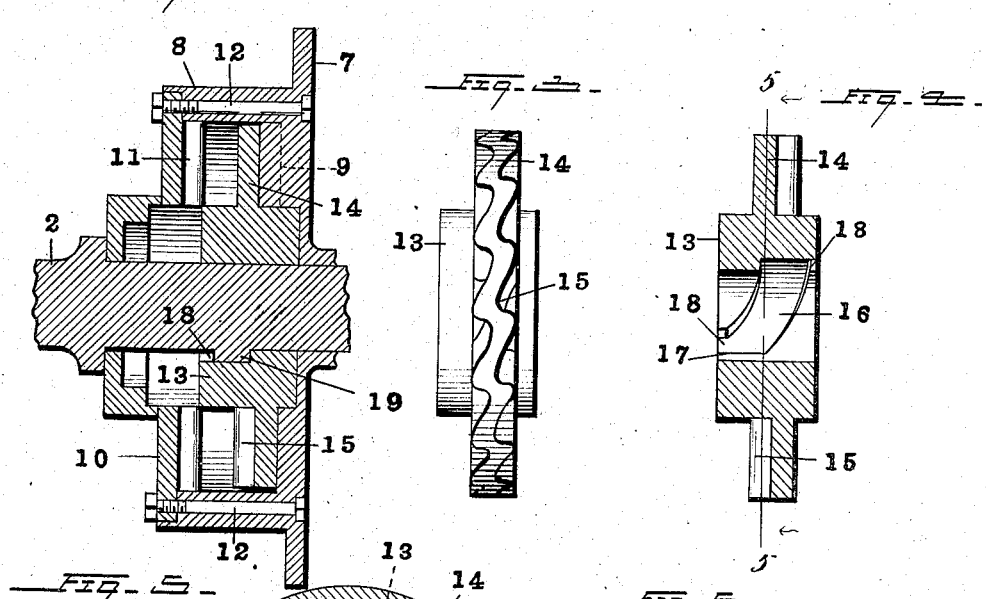
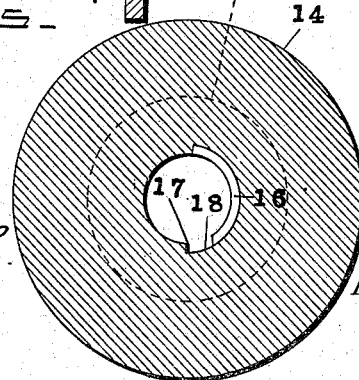
WITNESSES:
INVENTOR
Richard F. Stewart
By
his Attorney

UNITED STATES PATENT OFFICE.

RICHARD F. STEWART, OF POCANTICO HILLS, NEW YORK.

DRIVING MECHANISM FOR AUTOMOBILES.

No. 905,244.       Specification of Letters Patent.       Patented Dec. 1, 1908.

Application filed September 9, 1905. Serial No. 277,781.

*To all whom it may concern:*

Be it known that I, RICHARD F. STEWART, a citizen of the United States, residing at Pocantico Hills, in the county of Westchester and State of New York, have invented new and useful Improvements in Driving Mechanism for Automobiles, of which the following is a specification.

The present device relates to automatic clutch devices for coupling a driving and a driven part, and is intended for use particularly in automobile driving mechanism, with which type of machine the invention has been illustrated in the accompanying drawings, and it is in connection with automobile driving mechanism that I shall hereinafter describe the invention, although it will be understood that the clutch is adaptable to machines of any type in which it is desirable to have an automatic clutching mechanism between a driving and a driven part.

The object of the invention is to provide a clutch device which will permit independent movement of the driving and the driven parts relative to each other, so that should the speeds of the driven and driving parts vary, the clutch mechanism will be automatically released to permit independent movement of the parts relative to each other, so that they will run free until their speeds are again synchronous, whereupon the clutch device will automatically pick up, and again couple the driving and driven parts together. This automatically operating clutch device, which provides for independent movement of the driving and driven parts, is of peculiar value in connection with automobile driving mechanism, for the reason that the wheels of an automobile in taking curves, traverse arcs of different radii, and it is necessary to make provision for this difference in travel between the two wheels of the car to prevent "skidding" or sliding of one of the wheels; and this is usually done by means of a divided driving axle and a differential gear, or an axle having independent differential gear connections at its ends with the opposed driving wheels. I am aware that such automatically acting clutches for driving automobiles are broadly old, and I make no claim thereto, as such, but my invention relates to certain improvements in construction and arrangement of the parts whereby greater reliability and certainty of operation results.

By means of the present invention, differential gearing connections between the driving part (axle) and driven parts (wheels) of an automobile may be dispensed with, and a continuous driving axle may be used, which axle, by means of my automatic clutch device, will automatically couple and uncouple with the driving wheels in whichever direction the axle may be rotating, so that differences in travel of the two wheels of the automobile are compensated for automatically through the clutch; which will now be described in detail, reference being had to the accompanying drawings forming a part of this specification and in which—

Figure 1 is a longitudinal sectional view of the driving axle, wheels, sprocket, and gear box of an automobile, showing my clutch devices applied thereto. Fig. 2 is an enlarged sectional view of a portion of one of the wheel hubs to show the clutch members, the clutch housing in which they are mounted, and the driving connections. Fig. 3 is an edge view of the shiftable connecting clutch member. Fig. 4 is a sectional view of the shiftable clutch member to show the cam groove by means of which the said clutch member is automatically thrown from one connecting position to another. Fig. 5 is a sectional view on line 5—5, Fig. 4. Fig. 6 is a detail view of a portion of the driving axle to show the projection thereon for engaging the cam groove of the shiftable clutch member.

Referring to the drawings by numerals, like numbers indicating like parts in the several views, 2 denotes the driving axle of an automobile, provided with the usual sprocket 3 or any suitable drive gear, and 4 indicates the customary gear box and axle sleeve for inclosing the axle and sprocket. The driving wheels 6 (at each end of the axle) may be of any desired type, and the inner hub member 7 of each of these driving wheels 6 has a box or housing 8 thereon, which is preferably formed integral with said hub member 7 as shown. This box or housing 8 forms a closed dust and water tight receptacle within which is mounted the automatic clutch mechanism. The said housing 8 is provided on its end or bottom with radially disposed ratchets 9, and the cover plate 10 for the clutch box or housing 8 is provided on its inner face with a similar set of radially disposed ratchets 11, these ratchets 11, however, being reversely arranged relative to the ratchets 9 on the opposite wall of the housing 8. The said cover plate 10 may be secured in any suitable manner to the clutch device or housing 8, as by means of bolts 12 (see Figs. 1 and 2). Within this ratchet-faced clutch-housing 8 is mounted the double-faced shiftable clutch-member, which is made up of the hub 13 and the web 14, said web 14, having on its opposite sides, oppositely arranged or reversely placed ratchet teeth 15, as clearly shown in Figs. 1 and 3. The said shifting clutch member is movable longitudinally for a predetermined distance on the driving axle within the limits of the clutch box or housing 8, and the ratchet teeth of the shifting clutch member and the ratchet-teeth of the walls of the clutch box or housing 8, are so arranged as to engage, one with the other, when the shifting clutch member is in one or the other of its two extreme positions, so that a positive driving connection through the clutch members is secured between the axle 2 and the driving wheels 6, whenever the shiftable clutch-member is in either of its extreme positions.

The hub 13 of the shifting clutch member is provided interiorly with a cam-groove 16, which cam-groove 16 preferably extends half way round the circumference of the hub bore, and has at each end abutments 17, and channels 18 running longitudinally from the cam-groove 16 to the ends of the hub 13 for convenience in assembling the shiftable clutch member upon the driving axle 2. The said driving axle is provided with a radial lug or projection 19, which, when the shiftable clutch member is in position, engages the cam groove 16, so that any difference in speeds of rotation between the driving axle 2 and the shiftable clutch member will have the effect of moving the shiftable clutch member longitudinally of the axle 2, in one direction or the other, according to the direction of rotation of the driving axle 2.

It will be obvious that if the speed of the driven part (wheel 6) should exceed that of the driving part (axle 2), as would be the case with the outside wheel of an automobile in taking a curve, the shiftable clutch-member will, by reason of the cam groove 16 and the axle lug 19, be shifted longitudinally on the axle 2, disengaging the ratchet-teeth on the shiftable clutch member from which ever set of opposed ratchet-teeth in the clutch-box or housing 8 it may be in mesh, thus permitting the wheel 6 to run free and independent of the axle 2. When the speed of the axle 2 and the wheel 6 are again synchronous, the lug 19, acting on the cam groove 16, will move the shifting clutch member lengthwise a predetermined distance and force it into engagement again with one of the opposed ratchet-faced walls of the housing 8, the lug 19 will take its bearing against one or the other of the abutments 17 at either end of the cam groove 16, and the parts be positively coupled in driving position. It is obvious that this action will take place whether the machine be running forward or backward, so that variations in speed between the driven and driving parts will be quickly and automatically taken care of.

It will be seen that the driving axle 2 has a positive driving connection with the shiftable clutch member through the lug 19, which bears against one or the other of the end abutments 17 of the cam groove 16, according to the direction of rotation of the axle 2, and yet one which cannot become jammed or set by reason of frictional engagement; for the lug 19 is free to leave its driving abutment without any effort, as is the case with frictionally engaged parts and permit independent rotary movement of the parts and longitudinal movement of the shiftable clutch-member, whenever variation in speeds occurs. Furthermore the shiftable clutch member, by reason of its ratchet-engagement, has a positive but readily disengageable driving connection with the wheel in either direction, so that the driving part or axle 2 will pick up the driven part or wheel 6 positively and instantly, without any lost motion or slip, and at the same time will permit instantaneous uncoupling of the parts and longitudinal movement of the shiftable clutch member when the need arises without the delay incident to jammed or frictionally engaged parts.

It will be seen that since the shiftable clutch-member positively engages the opposed clutch-members in making its driving connection and does not depend on frictionally engaged surfaces for its driving action, it, as also the opposed clutch members, may be made small and light so as to permit of compact assembling and an unobtrusive structure. Furthermore, by reason of the quick and positive shift of the shiftable clutch-member attainable through the cam-groove and axle-lug connection, it is unnecessary to depend on the inertia or frictional retardation of the parts to secure such shift, but this is accomplished with absolute positiveness and certainty.

The embodiment of the invention herein illustrated and described is merely one physical expression of my invention and solely for illustrative purposes in order that the invention may be clear to those skilled in the art to which it belongs, and though it is the best embodiment now known to me, since it is obvious that the invention may be expressed in different mechanical constructions, I do not wish to be understood as limiting myself to anything herein shown and described except so far as I am limited by the prior art to which this invention relates.

Having fully disclosed my invention, I claim:—

1. Driving mechanism comprising, in combination, a rotary driving part, a part to be driven, a connecting element shiftable a predetermined distance into either of two different positions, and when in either position serving to positively lock said driving and driven parts together, means for automatically shifting said connecting element from one position to the other, and square shouldered interlocking formations connecting said driving part and shiftable element.

2. Driving mechanism comprising in combination a rotary driving part, a part to be driven, a connecting element shiftable a predetermined distance into either of two different positions, and when in either position serving to positively lock said driving and driven parts together, a cam formation on said connecting element for shifting the same from one position to the other, and square-shouldered interlocking formations connecting said driving part and shiftable element.

3. Driving mechanism comprising, in combination, a rotary shaft, a wheel to be driven, a connecting element shiftable lengthwise said shaft a predetermined distance, and when at either limit of its movement serving to positively lock said shaft and wheel together, a cam formation for shifting said element automatically, and square-shouldered, interlocking formations connecting said shaft and shiftable element.

4. Automobile driving mechanism comprising, in combination, a driving axle; a wheel to be driven; a clutch-housing on said wheel; opposed, reversely-ratcheted clutch-members in said housing; a shiftable reversely-ratcheted clutch-member in said housing between said opposed clutch members; and square-shouldered interlocking formations carried by said axle and shiftable clutch member, and serving both to shift the latter a predetermined distance into positive engagement with either of said opposed clutch members, and, when so shifted, to form a positive driving connection between said shiftable member and axle.

5. Automobile driving mechanism comprising a driving axle, a wheel to be driven, a connecting element shiftable a predetermined distance lengthwise said axle, and when in either of its two extreme positions serving to positively lock said wheel and axle together, a square faced lug carried by said axle, a cam groove formed in said connecting element and coöperating with said lug to shift said element from one position to the other, and a square-shouldered abutment also carried by said element and coöperating with said lug to form a positive connection by means of which said shiftable element is driven by said axle.

6. Automobile driving mechanism comprising, in combination, a driving axle; a wheel mounted on said axle; opposed, reversely-ratcheted clutch-members on said wheel; a double-faced, reversely-ratcheted clutch member mounted on said axle between said opposed clutch-members and provided with a cam-groove; a projection on said axle engaging the cam-groove in said clutch-member to shift the said member a predetermined distance in one or the other direction to positively engage with one or the other of said opposed clutch-members; and driving abutments at the ends of the cam-groove against which the axle-projection takes a positive driving engagement.

7. Automobile driving mechanism comprising, in combination, a driving axle; a wheel mounted on said axle; a hollow hub or clutch-housing on said wheel; opposed, reversely-ratcheted clutch-members in said housing; a double-faced, reversely-ratcheted clutch-member having a circumferential cam-groove on its hub-interior mounted on said axle within said housing; a lug on said axle to engage said cam-groove and move said clutch-member a predetermined distance into engagement with one or the other of said opposed clutch-members, according to the direction of rotation of the axle; and longitudinal channels at the ends of said cam-groove to permit assembling of the clutch-member on the axle and provide driving abutments at the ends of the groove against which the said axle-projection bears when in driving position.

8. Automobile driving mechanism comprising, in combination, a driving axle; a wheel mounted on said axle; an inner hollow hub-member on said wheel having a ratcheted clutch-face at its bottom; a cover for said hub-member having a reversely ratcheted inner face; a shiftable clutch member having reversely-ratcheted faces mounted on said axle within said hollow hub and provided interiorly of its hub with a cam-groove; a radial lug on said axle engaging said cam-groove to shift said clutch member a predetermined distance in either direction; and abutments at the ends of said cam-groove against which said lug rests when the parts are in driving condition.

In testimony whereof I have hereunto set my hand in presence of two subscribing witnesses.

RICHARD F. STEWART.

Witnesses:
HENRY T. MELONEY,
EMMA S. STEWART.